US012241603B2

(12) United States Patent
Lee

(10) Patent No.: US 12,241,603 B2
(45) Date of Patent: Mar. 4, 2025

(54) TRANSPARENT LAMP STRIP AND FLAME LAMP THEREOF

(71) Applicant: James Lee, Guangdong (CN)

(72) Inventor: James Lee, Guangdong (CN)

(73) Assignee: Hui Zhou Gateway Plastic and Hardware Lighting Co., Ltd., Huizhou (CN)

( * ) Notice: Subject to any disclaimer, the term of this patent is extended or adjusted under 35 U.S.C. 154(b) by 167 days.

(21) Appl. No.: 18/179,447

(22) Filed: Mar. 7, 2023

(65) Prior Publication Data

US 2023/0204170 A1 Jun. 29, 2023

(51) Int. Cl.

| | |
|---|---|
| ***F21S 4/24*** | (2016.01) |
| ***F21S 4/10*** | (2016.01) |
| ***F21S 10/04*** | (2006.01) |
| ***F21V 19/00*** | (2006.01) |
| ***F21V 23/06*** | (2006.01) |

(52) U.S. Cl.

CPC . *F21S 4/24* (2016.01); *F21S 4/10* (2016.01); *F21S 10/043* (2013.01); *F21V 19/003* (2013.01); *F21V 23/06* (2013.01)

(58) Field of Classification Search

CPC ....... H05B 45/46; F21V 23/06; F21V 19/003; F21S 4/24; F21S 4/10; F21S 10/043

See application file for complete search history.

(56) References Cited

FOREIGN PATENT DOCUMENTS

| | | | | |
|---|---|---|---|---|
| CN | 106168337 A | * | 11/2016 | ............... F21K 9/90 |
| CN | 110099487 B | * | 5/2021 | ............ F21S 10/043 |
| TW | I708908 B | * | 1/2020 | |

* cited by examiner

*Primary Examiner* — Anabel Ton

(57) ABSTRACT

A transparent lamp strip and a flame lamp of the transparent lamp strip are provided. A substrate is made of a transparent FPC material. A printed circuit is printed on the surface of the transparent FPC material. SMDLED lamp beads are fixedly arranged on the surface of the substrate and are electrically connected to a main control unit via the printed circuit. A light strip realizes the visual effect of simulating the flame and can realize 360° C. light emission, which makes the visual effect smoother.

8 Claims, 7 Drawing Sheets

TRANSPARENT LAMP STRIP AND FLAME LAMP THEREOF

FIELD OF THE INVENTION

The invention relates to lamp strips and more particularly to a transparent lamp strip and a flame lamp thereof.

BACKGROUND OF THE INVENTION

Lamp strip is another name for lamp belt, which is also named for its shape. Just like Chinese hieroglyphs, it is derived from its shape and associated materials. The circuit board of the lamp belt in the conventional art is generally not transparent, resulting in a limited light-emitting angle of the lamp beads, and further reducing the decorative effect. In addition, the lamp strip in the conventional art is single and poor in light-emitting effect.

Thus, the need for improvement still exists.

SUMMARY OF THE INVENTION

In order to solve the above problems, the invention provides a transparent lamp strip and a flame lamp thereof to enable 360° C. light emission, which makes the visual effect smoother. During use, the effect that the lamp can be seen and the board is hidden is achieved, and the elegance and quality of the lamp strip are improved. Moreover, a plurality of surface-mounted device light-emitting diode (SMDLED) lamp beads on the entire transparent flexible printed circuit (FPC) lamp strip can simulate the effect of flames, thereby making the visual effect smoother.

In order to achieve the above object, the invention adopts the technical solution as follows: a transparent FPC lamp strip, including a substrate, SMDLED lamp beads, and a main control unit (MCU), where the substrate is made of transparent FPC material, a printed circuit is printed on the surface of the transparent FPC material, a plurality of SMDLED lamp beads are fixedly arranged on the surface of the substrate, the plurality of SMDLED lamp beads are electrically connected to the main control unit via the printed circuit, and the substrate is further provided with a positive terminal and a negative terminal which are electrically connected to the main control unit via the printed circuit; and each SMDLED lamp bead includes an LED crystal and an LED bracket wrapped outside the LED crystal, where the LED bracket is made of a transparent material.

As a further preferred solution, a filter capacitor C2 is further included. A positive electrode of the filter capacitor C2 is electrically connected to the positive terminal via the printed circuit, and a negative electrode of the filter capacitor C2 is electrically connected to the negative terminal via the printed circuit.

As a further preferred solution, each of the plurality of SMDLED lamp beads includes a first LED patch LED1, a second LED patch LED2, a third LED patch LED3, a fourth LED patch LED4, a fifth LED patch LED5, a sixth LED patch LED6, a seventh LED patch LED7, and an eighth LED patch LED8; the model of the MCU is TH574; the positive electrodes of the first LED patch LED1, the second LED patch LED2, the third LED patch LED3, the fourth LED patch LED4, the fifth LED patch LED5, the sixth LED patch LED6, the seventh LED patch LED7 and the eighth LED patch LED8 are all connected to the positive terminal via the printed circuit.

The negative electrodes of the first LED patch LED1 and the second LED patch LED2 are both connected to a seventh pin of the MCU via the printed circuit, the negative electrode of the third LED patch LED3 is connected to a sixth pin of the MCU via the printed circuit, the negative electrode of the fourth LED patch LED4 is connected to a fifth pin of the MCU via the printed circuit, the negative electrodes of the fifth LED patch LED5 and the sixth LED patch LED6 are both connected to a fourth pin of the MCU via the printed circuit, the negative electrode of the seventh LED patch LED7 is connected to a third pin of the MCU, and the negative electrode of the eighth LED patch LED8 is connected to a second pin of the MCU, where the positive terminal is connected to a first pin of the MCU via the printed circuit.

As a further preferred solution, a pulse-width modulation (PWM) pulse signal module is disposed in the MCU and outputs PWM pulse signals via the second to the seventh pins of the MCU, respectively. Meanwhile, the MCU controls the brightness of corresponding SMDLEDs by changing a square wave duty cycle of the PWM pulse signals.

The invention further provides a flame lamp, including a bulb shell, a lens, the transparent FPC lamp strip mentioned above, and a connecting cover having a negative connection point and a positive connection point. The transparent FPC lamp strip is assembled in the lens, the lens is assembled inside the bulb shell, the connecting cover is assembled at an opening of the bulb shell, the positive terminal of the transparent FPC lamp strip is electrically connected to the positive connection point via a positive wire, and the negative terminal of the transparent FPC lamp strip is electrically connected to the negative connection point via a negative wire.

As a further preferred solution, an external thread is provided at the opening of the bulb shell, the positive connection point is a connecting screw, and a corresponding assembling hole is defined on the top of the connecting cover. The connecting screw is assembled in the assembling hole, and the positive wire is assembled between the connecting screw and the assembling hole; the negative connection point is provided on a side wall of the connecting cover, and a side wall of the connecting cover is of a threaded structure. The connecting cover is screwed to the opening of the bulb shell via the side wall, and the negative wire is arranged between the opening of the bulb shell and the side wall of the connecting cover.

As a further preferred solution, the lens includes a limit sleeve and a cut lens assembly, which are sequentially connected from the top down. The transparent FPC lamp strip passes through the limit sleeve to be assembled in the cut lens assembly, and the plurality of SMDLED lamp beads are arranged in the length direction of the cut lens assembly.

As a further preferred solution, the cut lens assembly includes a cylindrical lens and a drop-shaped lens. The top of the cylindrical lens is communicated with the limit sleeve, and the drop-shaped lens is communicated with the bottom of the cylindrical lens. Several facets are evenly distributed on the side wall of the cylindrical lens and the surface of the drop-shaped lens.

As a further preferred solution, assembling guide grooves are arranged at two sides of an inner wall of the cylindrical lens, and two sides of the substrate are respectively assembled in the assembling guide grooves.

As a further preferred solution, the top of the limit sleeve is provided with a circle of teeth, and the negative wire is clamped among the teeth.

The invention has the following advantages and benefits in comparison with the conventional art:

In the invention, the substrate is made of a transparent FPC material, a printed circuit is printed on the surface of the transparent FPC material, a plurality of SMDLED lamp beads are fixedly arranged on the surface of the substrate, and the plurality of SMDLED lamp beads are electrically connected to the main control unit via the printed circuit. Meanwhile, each SMDLED lamp bead includes an LED crystal and an LED bracket wrapped outside the LED crystal, and the LED bracket is made of a transparent material, where both the substrate and the LED bracket are made of a transparent material, so that a light strip product manufactured has good visual effect and can realize 360° C. light emission, which makes the visual effect smoother.

During use, the effect that the lamp can be seen and the board is hidden is achieved, and the elegance and quality of the lamp strip are improved.

In the invention, by controlling a square wave duty cycle of PWM pulse signals output by pins of the MCU, the brightness of corresponding SMDLEDs can be controlled, so that the plurality of SMDLED lamp beads on the entire transparent FPC lamp strip can simulate the effect of flames, thereby making the visual effect smoother.

In the specific embodiment, several facets are evenly distributed on the surfaces of the cylindrical lens and the drop-shaped lens, and the facets are of a rhombus structure. Therefore, when the light emitted by the SMDLED lamp beads is directed to the lens, a refractive path of the light can be changed by means of the rhombus facets on the surfaces of the cylindrical lens and the drop-shaped lens, which is conducive to the diffusion and blending of the light. That is, the light is better blended, so that the color temperature of the light emitted by the lens is more uniform, thereby effectively eliminating the yellow edge.

The above and other objects, features and advantages of the invention will become apparent from the following detailed description taken with the accompanying drawings.

DETAILED DESCRIPTION OF THE INVENTION

Figure 1:
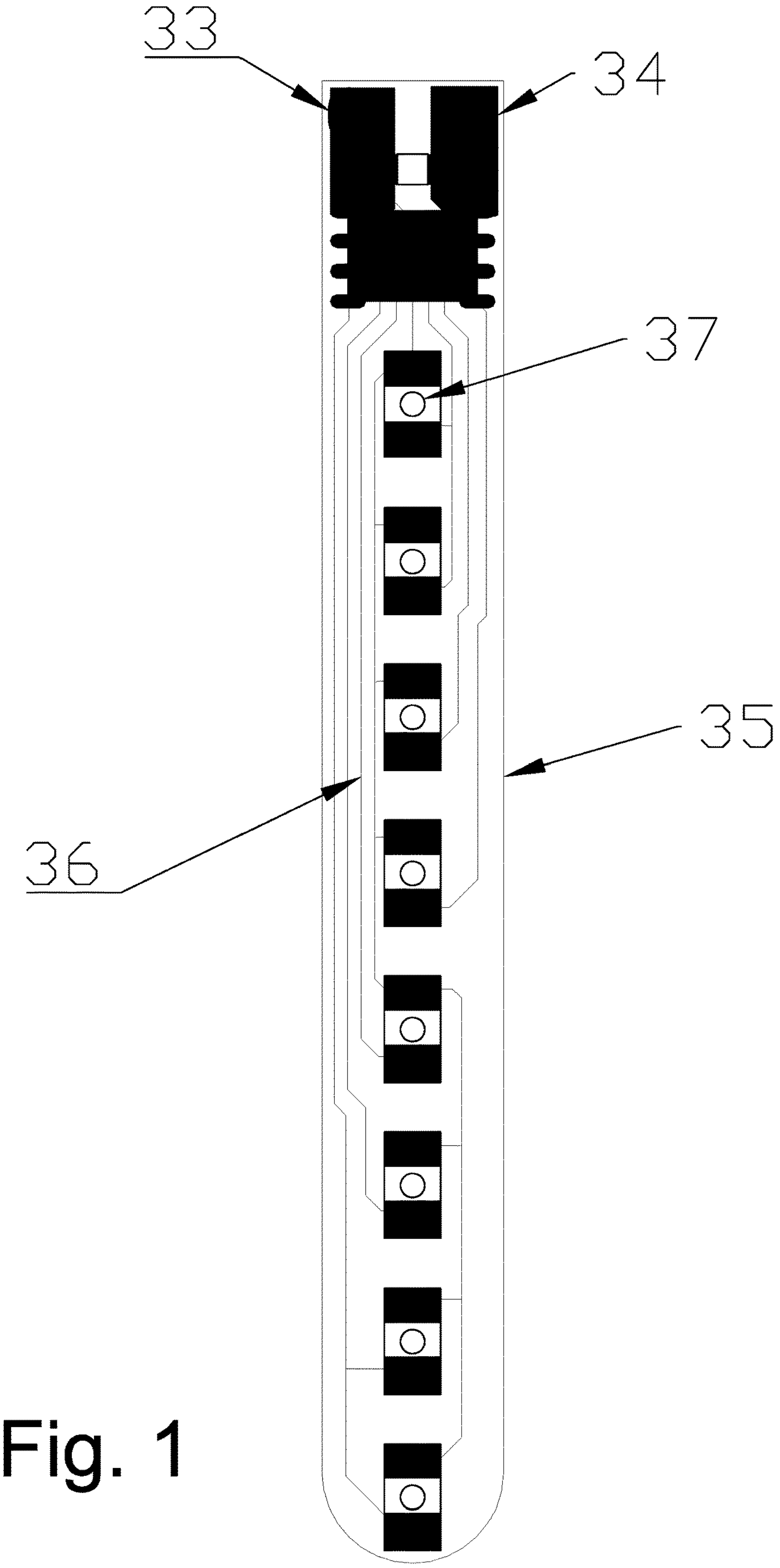
FIG. 1 is a schematic structural diagram of a transparent FPC lamp strip of the invention.
Figure 2:
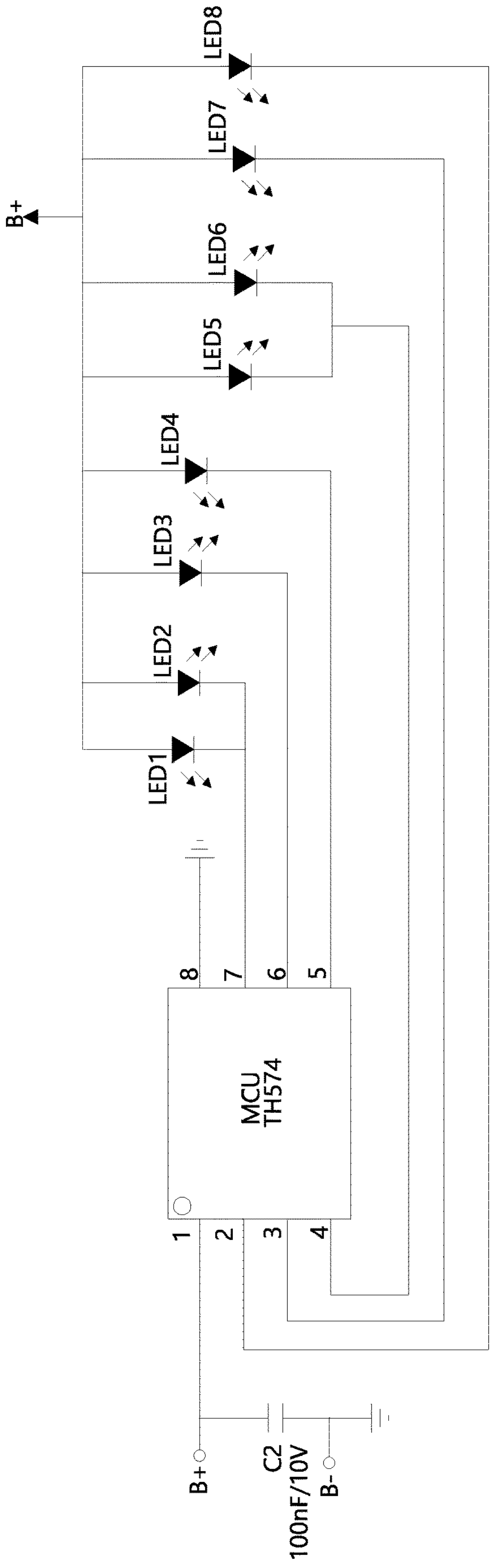
FIG. 2 is a circuit diagram of the transparent FPC lamp strip.
Figure 3:
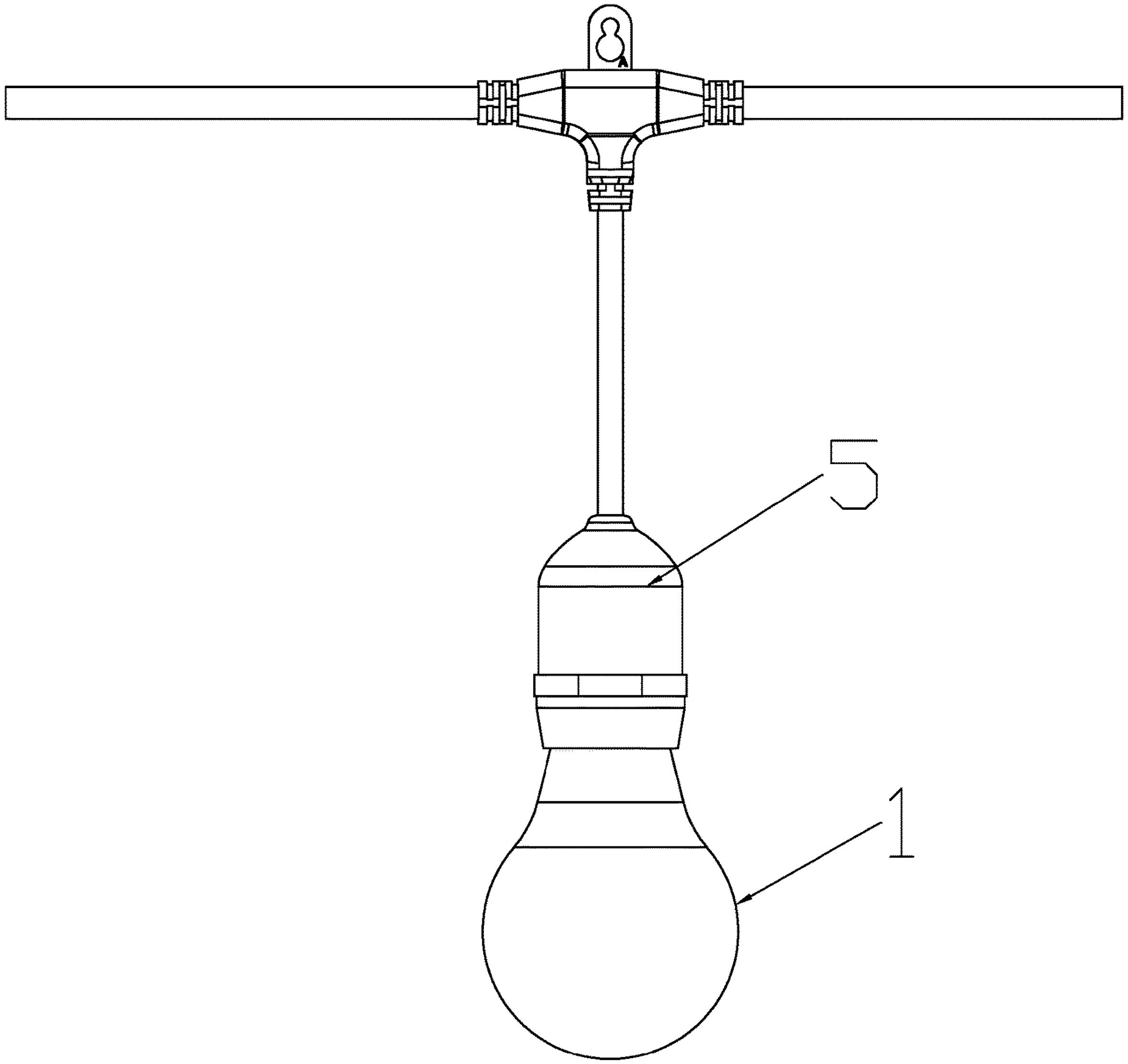
FIG. 3 is a side elevation of a flame lamp of the invention.
Figure 4:
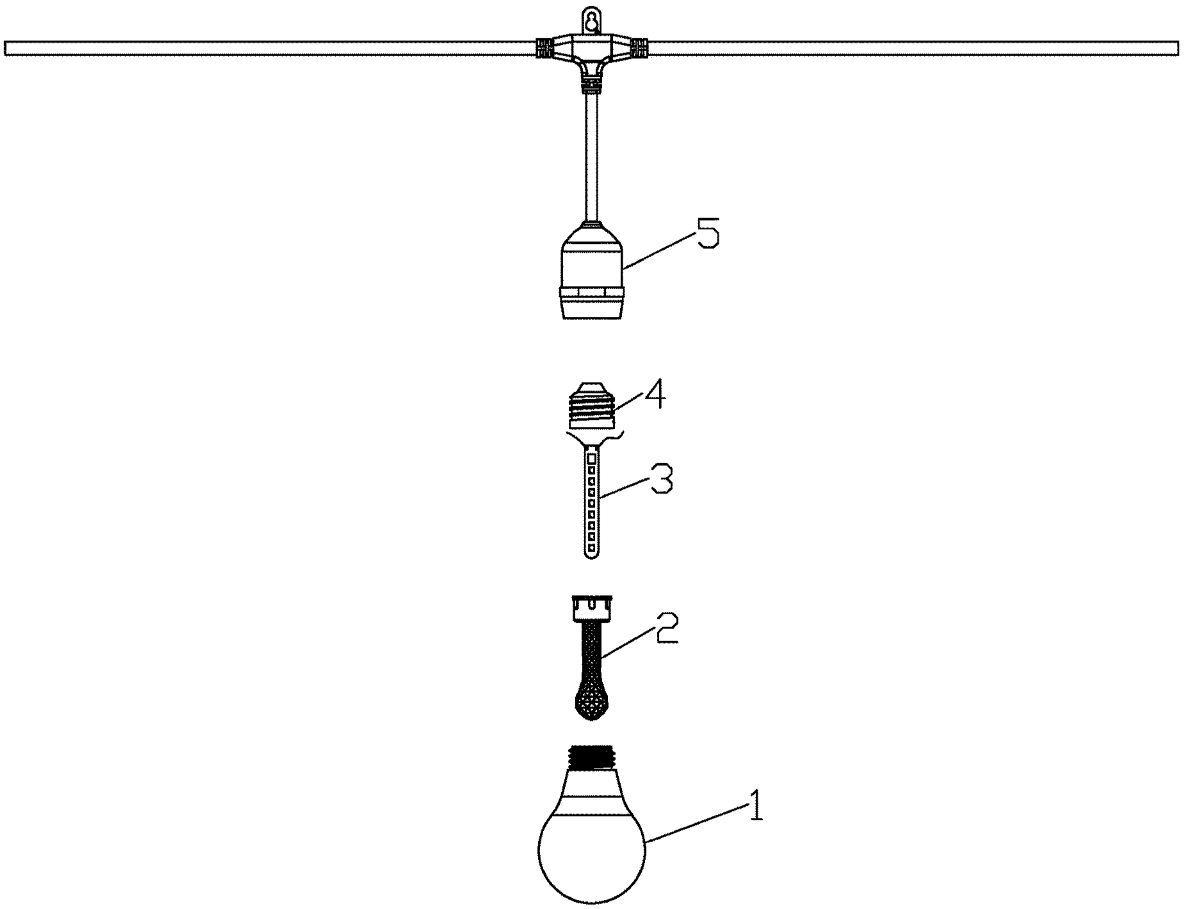
FIG. 4 is an exploded view the flame lamp.

Referring to FIGS. 1-2, the invention provides a transparent FPC lamp strip 3, including a substrate 35, SMDLED lamp beads 37, and a main control unit (MCU). The substrate 35 is made of a transparent FPC material, and a printed circuit 36 is printed on the surface of the transparent FPC material. A plurality of SMDLED lamp beads 37 are fixedly arranged on the surface of the substrate 35 and are electrically connected to the main control unit via the printed circuit 36. The substrate 35 is further provided with a positive terminal 33 and a negative terminal 34 which are electrically connected to the MCU via the printed circuit 36. Each SMDLED lamp bead 37 includes a light-emitting diode (LED) crystal and an LED bracket wrapped outside the LED crystal, and the LED bracket is made of a transparent material.

In the invention, the substrate 35 is made of a transparent FPC material, and a printed circuit 36 is printed on the surface of the transparent FPC material. A plurality of SMDLED lamp beads 37 are fixedly arranged on the surface of the substrate 35 and are electrically connected to the main control unit via the printed circuit 36. A light strip product manufactured has good visual effect. During use, the effect that the lamp can be seen and the board is hidden is achieved, and the elegance and quality of the lamp strip are improved.

As shown in FIG. 2 specifically, as a further preferred solution, a filter capacitor C2 is further included. A positive electrode of the filter capacitor C2 is electrically connected to the positive terminal 33 via the printed circuit 36, and a negative electrode of the filter capacitor C2 is electrically connected to the negative terminal 34 via the printed circuit 36. As a further preferred solution, each of the plurality of SMDLED lamp beads 37 includes a first LED patch LED1, a second LED patch LED2, a third LED patch LED3, a fourth LED patch LED4, a fifth LED patch LED5, a sixth LED patch LED6, a seventh LED patch LED7, and an eighth LED patch LED8. The model of the MCU is TH574. Positive electrodes of the first LED patch LED1, the second LED patch LED2, the third LED patch LED3, the fourth LED patch LED4, the fifth LED patch LED5, the sixth LED patch LED6, the seventh LED patch LED7 and the eighth LED patch LED8 are all connected to the positive terminal 33 via the printed circuit 36. Negative electrodes of the first LED patch LED1 and the second LED patch LED2 are both connected to a seventh pin of the MCU via the printed circuit 36. The negative electrode of the third LED patch LED3 is connected to a sixth pin of the MCU via the printed circuit 36. The negative electrode of the fourth LED patch LED4 is connected to a fifth pin of the MCU via the printed circuit 36. The negative electrodes of the fifth LED patch LED5 and the sixth LED patch LED6 are both connected to a fourth pin of the MCU. The negative electrode of the seventh LED patch LED7 is connected to a third pin of the MCU. The negative electrode of the eighth LED patch LED8 is connected to a second pin of the MCU. The positive terminal 33 is connected to a first pin of the MCU via the printed circuit 36.

As a further preferred solution, a PWM pulse signal module is disposed in the MCU and outputs PWM pulse signals via the second to the seventh pins of the MCU. Meanwhile, the MCU controls the brightness of corresponding SMDLEDs by changing a square wave duty cycle of the PWM pulse signals.

The principle of the MCU controlling corresponding SMDLEDs by means of the PWM pulse signal module is discussed in detail below.

When a corresponding pin of the MCU outputs a high-level signal, the corresponding connected SMDLED emits light. When the MCU outputs a low-level signal, a corresponding SMDLED goes out. Since a PWM pulse signal output by the MCU has a certain duty cycle that changes periodically, an average output current value in the circuit has a certain value that changes periodically, so that the corresponding SMDLED also has a certain brightness that changes periodically.

Taking the seventh pin of the MCU as an example, the frequency of the PWM pulse signals output by the seventh pin of the MCU is 160 Hz, that is, the output signals take 6.25 ms as a cycle. The duty cycle of the output signals of the MCU varies from 2% to 80%, and the duty cycle changes by 2% every 100 ms (that is, sixteen cycles). In an embodiment, the time of initial power-on is recorded as time 0. The MCU then starts to control I/O to periodically output signals with a duty cycle of 2%. In an embodiment, in a cycle with a duration of 6.25 ms, 1*125 μs high-level signals and 49*125 μs low-level signals can be output to achieve a duty cycle of 2%. After 100 ms, that is, after sixteen cycles of output, the MCU controls I/O to periodically output signals with a duty cycle of 4%. In an embodiment, in a cycle with a duration of 6.25 ms, 2*125 μs high-level signals and 48*125 μs low-level signals can be output to achieve a duty cycle of 4%. By analogy, the duty cycle of the output signals gradually increases, and the brightness of the breathing lamp increases. Until after 3900 ms, I/O periodically outputs signals with a duty cycle of 80%, and the brightness of the breathing lamp reaches the maximum. After another 100 ms, that is, after sixteen cycles of output, the duty cycle starts to decrease under the control of I/O in the same way, and the brightness of the breathing lamp decreases. At 7800 ms, the duty cycle of the output signals is 2%, which is the same as the duty cycle at time 0. At this time, the system can be regarded as entering a new round of cycle from 7800 ms, and the duty cycle of the output signals is increased from 2% to 80% and then drops back to 2%, that is, the first LED patch LED1 and the second LED patch LED2 connected to the seventh pin of the MCU realize the brightness change from the darkest to the brightest then to the darkest.

By controlling the square wave duty cycle of the PWM pulse signals output by other pins of the MCU, the brightness of corresponding SMDLEDs can be controlled, so that the plurality of SMDLEDs on the entire transparent FPC lamp strip 3 can simulate the effect of flames, thereby making the visual effect smoother.

Referring to FIGS. 3-8, the invention further provides a flame lamp, including a bulb shell 1, a lens 2, the transparent FPC lamp strip 3 mentioned above, and a connecting cover 4 having a negative connection point and a positive connection point. The transparent FPC lamp strip 3 is assembled in the lens 2, the lens 2 is assembled inside the bulb shell 1, and the connecting cover 4 is assembled at an opening 11 of the bulb shell 1. A positive terminal 33 of the transparent FPC lamp strip 3 is electrically connected to the positive connection point via a positive wire 31, and a negative terminal 34 of the transparent FPC lamp strip 3 is electrically connected to the negative connection point via a negative wire 32.

Figure 5:
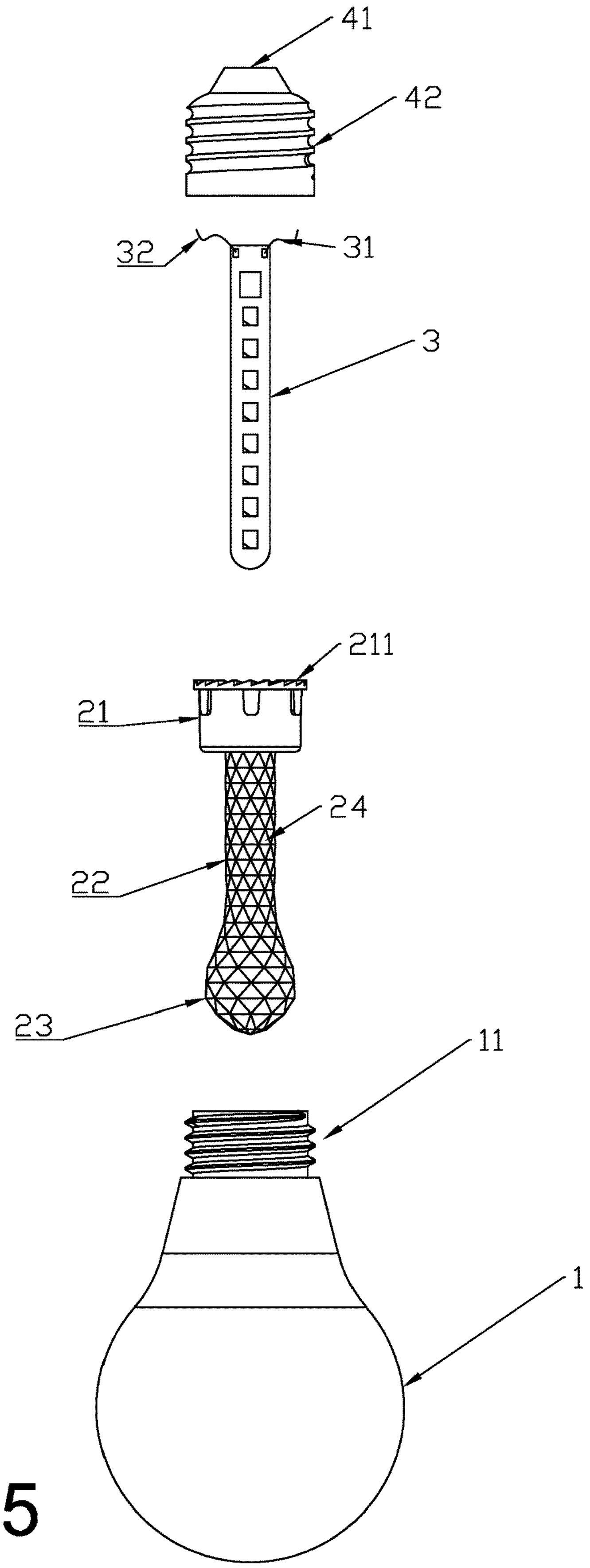
FIG. 5 is an exploded view of the flame lamp with the lamp base omitted.

As shown in FIG. 5 specifically, as a further preferred solution, an external thread is provided at the opening 11 of the bulb shell 1. The positive connection point is a connecting screw 41, and a corresponding assembling hole 421 is defined on the top of the connecting cover 4. The connecting screw 41 is assembled in the assembling hole 421, and the positive wire 31 is assembled between the connecting screw 41 and the assembling hole 421. The negative connection point is provided on a side wall of the connecting cover 4, and the side wall of the connecting cover 4 is of a threaded structure 42. The connecting cover 4 is screwed to the opening 11 of the bulb shell 1 via the side wall, and the negative wire 32 is arranged between the opening 11 of the bulb shell 1 and the side wall of the connecting cover 4.

In this embodiment, the positive wire 31 is assembled between the connecting screw 41 and the assembling hole 421, and the negative wire 32 is arranged between the opening 11 of the bulb shell 1 and the side wall of the connecting cover 4, that is, the transparent FPC lamp strip 3 can be easily removed from the lens 2. Moreover, when the connecting cover 4 is assembled with the opening 11 of the bulb shell 1, a complete bulb structure is formed and can be assembled in the lamp base 5. The lamp base 5 internally includes a negative elastic piece and a positive elastic piece. The positive elastic piece is in contact with the connecting screw 41 to realize an electrical connection, and the negative elastic piece is in contact with the side wall of the connecting cover 4 to realize an electrical connection.

As shown in FIG. 5 specifically, as a further preferred solution, the lens 2 includes a limit sleeve 21 and a cut lens assembly which are sequentially connected from the top down. The transparent FPC lamp strip 3 passes through the limit sleeve 2 to be assembled in the cut lens assembly, and a plurality of SMDLED lamp beads 37 are arranged in a length direction of the cut lens assembly. As a further preferred solution, the cut lens assembly includes a cylindrical lens 22 and a drop-shaped lens 23. The top of the cylindrical lens 22 is communicated with the limit sleeve 21, and the drop-shaped lens 23 is communicated with the bottom of the cylindrical lens 22. Several facets 24 are evenly distributed on the side wall of the cylindrical lens 22 and the surface of the drop-shaped lens 23.

As shown in FIGS. 3-8 specifically, in this embodiment, several facets 24 are evenly distributed on the surfaces of the cylindrical lens 22 and the drop-shaped lens 23, and the facets 24 are of a rhombus structure. Therefore, when the light emitted by the SMDLED lamp beads 37 is directed to the lens 2, a refractive path of the light can be changed by means of the rhombus facets 24 on the surfaces of the cylindrical lens 22 and the drop-shaped lens 23, which is conducive to the diffusion and blending of the light. That is, the light is better blended, so that the color temperature of the light emitted by the lens 2 is more uniform, thereby effectively eliminating the yellow edge.

Figure 8:
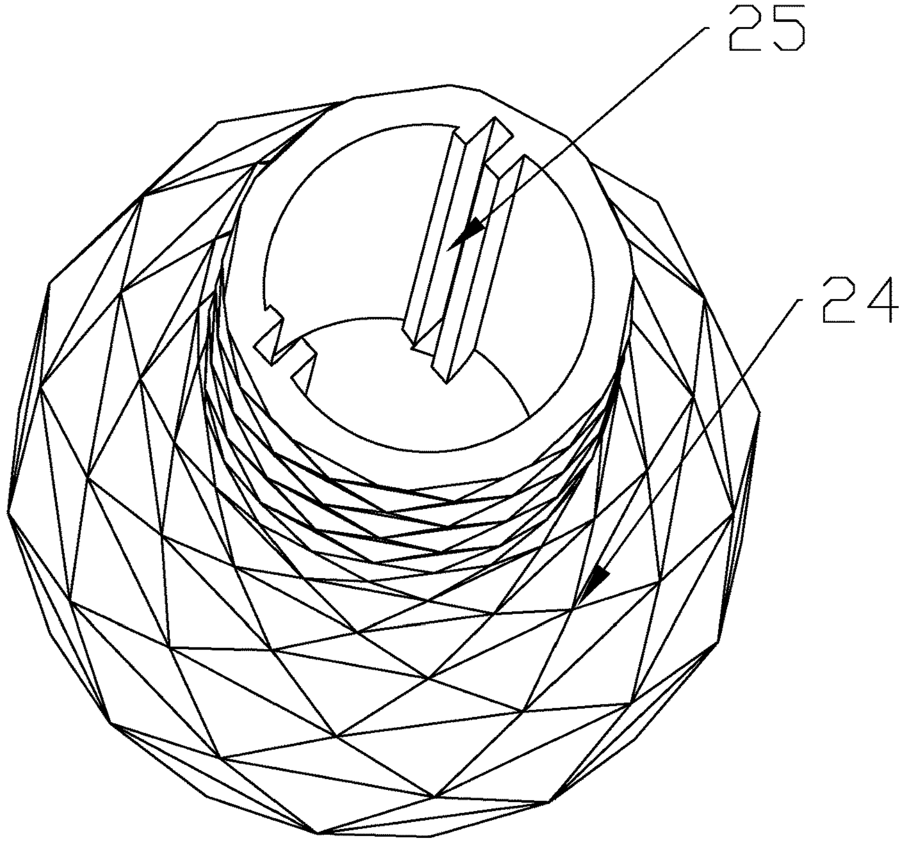
FIG. 8 is a perspective view of a lens assembly with a limit sleeve omitted.

As shown in FIG. 8 specifically, as a further preferred solution, assembling guide grooves 25 are arranged at two sides of an inner wall of the cylindrical lens 22, and two sides of the substrate 35 are respectively assembled in the assembling guide grooves 25. In order to facilitate the assembly of the substrate 35 in the cylindrical lens 22, in this embodiment, assembling the two sides of the substrate 35 in the assembling guide grooves 25 can effectively fix the position of the substrate 35, and at the same time, prevent position offset of the substrate 35 which will affect the light-emitting effect.

Figure 6:
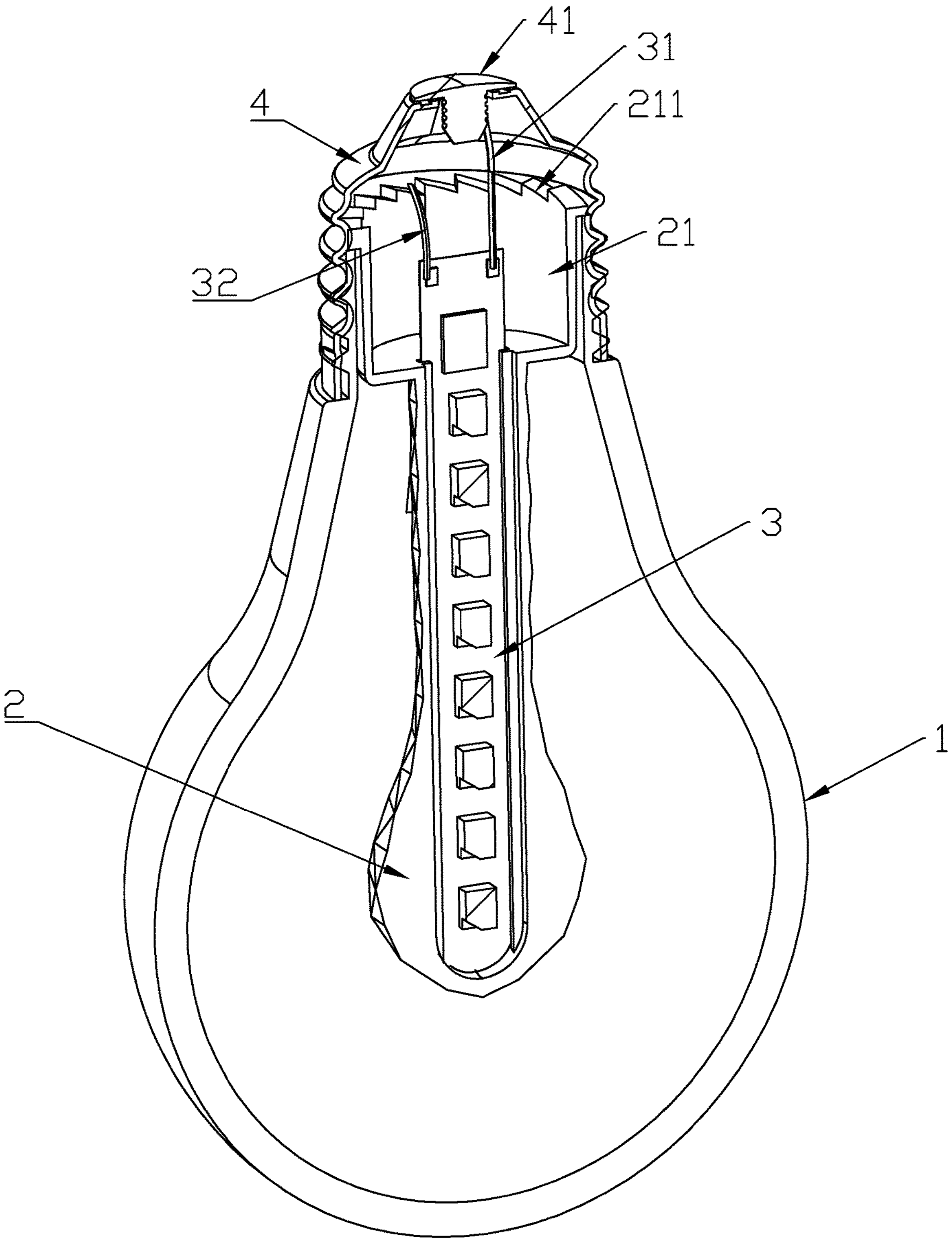
FIG. 6 is a longitudinal sectional view of the flame lamp.
Figure 7:
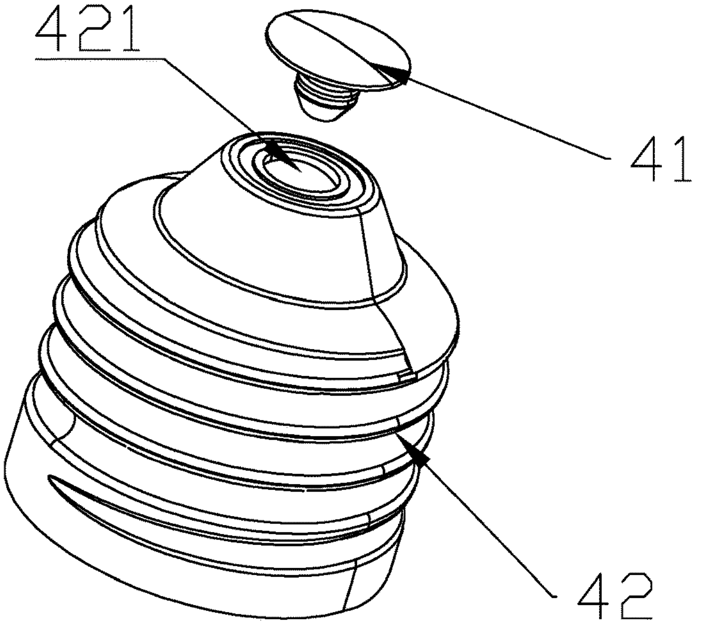
FIG. 7 is an exploded view of the connecting cover and the connecting screw.

As shown in FIGS. 5-6 specifically, as a further preferred solution, the top of the limit sleeve 21 is provided with a circle of teeth 211, and the negative wire 32 is clamped among the teeth 211. Since the negative wire 32 is arranged between the opening 11 of the bulb shell 1 and the side wall of the connecting cover 4 mentioned above, when the connecting cover 4 rotates to be assembled with the opening 11 of the bulb shell 1, the negative wire 32, if not positioned, is easy to rotate along with the connecting cover 4, that is, the negative wire 32 is easy to be entangled with the positive wire 31. Therefore, in the invention, the negative wire 32 is clamped at cogging positions among the teeth 211, so that when the connecting cover 4 rotates, the negative wire 32 will not rotate therewith.

While the invention has been described in terms of preferred embodiments, those skilled in the art will recognize that the invention can be practiced with modifications within the spirit and scope of the appended claims.

What is claimed is:

1. A transparent FPC lamp strip, comprising a substrate, a plurality of SMDLED lamp beads, and an MCU;

wherein the substrate is made of a transparent FPC material, a printed circuit is printed on the surface of the transparent FPC material, the SMDLED lamp beads are fixedly arranged on the surface of the substrate and are electrically connected to the MCU via the printed circuit, and the substrate is further provided with a positive terminal and a negative terminal which are electrically connected to the MCU via the printed circuit;

wherein each of the SMDLED lamp beads comprise an LED crystal and an LED bracket wrapped outside the LED crystal, the LED bracket being made of a transparent material;

a filter capacitor (C2), wherein a positive electrode of the filter capacitor (C2) is electrically connected to the positive terminal via the printed circuit, and a negative electrode of the filter capacitor (C2) is electrically connected to the negative terminal via the printed circuit;

wherein each of the SMDLED lamp beads comprise a first LED patch (LED1), a second LED patch (LED2), a third LED patch (LED3), a fourth LED patch (LED4), a fifth LED patch (LED5), a sixth LED patch (LED6), a seventh LED patch (LED7), and an eighth LED patch (LED8);

wherein positive electrodes of the first LED patch (LED1), the second LED patch (LED2), the third LED patch (LED3), the fourth LED patch (LED4), the fifth LED patch (LED5), the sixth LED patch (LED6), the seventh LED patch (LED7), and the eighth LED patch (LED8) are all connected to the positive terminal via the printed circuit; and wherein negative electrodes of the first LED patch (LED1) and the second LED patch (LED2) are both connected to a seventh pin of the MCU via the printed circuit, a negative electrode of the third LED patch (LED3) is connected to a sixth pin of the MCU via the printed circuit, a negative electrode of the fourth LED patch (LED4) is connected to a fifth pin of the MCU via the printed circuit, negative electrodes of the fifth LED patch (LED5) and the sixth LED patch (LED6) are both connected to a fourth pin of the MCU via the printed circuit, a negative electrode of the seventh LED patch (LED7) is connected to a third pin of the MCU, a negative electrode of the eighth LED patch (LED8) is connected to a second pin of the MCU, and the positive terminal is connected to a first pin of the MCU via the printed circuit.

2. The transparent FPC lamp strip of claim 1, wherein a PWM pulse signal module is disposed in the MCU and outputs PWM pulse signals via the second to the seventh pins of the MCU, respectively; meanwhile, the MCU controls the brightness of corresponding SMDLEDs by changing a square wave duty cycle of the PWM pulse signals.

3. A flame lamp, comprising a bulb shell, a lens, the transparent FPC lamp strip of claim 2, and a connecting cover having a negative connection point and a positive connection point, wherein the transparent FPC lamp strip is assembled in the lens, the lens is assembled inside the bulb shell, the connecting cover is assembled at an opening of the bulb shell, a positive terminal of the transparent FPC lamp strip is electrically connected to the positive connection point via a positive wire,-and a negative terminal of the transparent FPC lamp strip is electrically connected to the. negative connection point via a negative wire.

4. The flame lamp of claim 3, wherein an external thread is provided at the opening of the bulb shell, the positive connection point is a connecting screw, and a corresponding assembling hole is defined on the top of the connecting cover, the connecting screw is assembled in the assembling hole, and the positive wire is assembled between the connecting screw and the assembling hole; the negative connection point is provided on a side wall of the connecting cover, and the side wall of the connecting cover is of a threaded structure, the connecting cover is screwed to the opening of the bulb shell via the side wall, and the negative wire is arranged between the opening of the bulb shell and the side wall of the connecting cover.

5. The flame lamp of claim 4, wherein the lens comprises a limit sleeve and a cut lens assembly which are sequentially connected from the top down, the transparent FPC lamp strip passes through the limit sleeve to be assembled in the cut lens assembly, and a plurality of SMDLED lamp beads are arranged in a length direction of the cut lens assembly.

6. The flame lamp of claim 5, wherein the cut lens assembly comprises a cylindrical Jens and a drop-shaped lens, the top of the cylindrical lens is communicated with the limit sleeve, and the drop-shaped lens is communicated with the bottom of the cylindrical lens; and several facets are evenly distributed on a side wall of the cylindrical lens and the surface of the drop-shaped lens.

7. The flame lamp of claim 6, wherein assembling guide grooves are arranged at two sides of an inner wall of the cylindrical lens, and two sides of the substrate are respectively assembled in the assembling guide grooves.

8. The flame lamp of claim 7, wherein the top of the limit sleeve is provided with a circle of teeth, and the negative wire is clamped among the teeth.

* * * * *